United States Patent
Cha et al.

(10) Patent No.: US 8,924,090 B2
(45) Date of Patent: Dec. 30, 2014

(54) METHOD FOR CONTROLLING OPERATION OF SIDE STEP FOR VEHICLE

(71) Applicant: Hyundai Motor Company, Seoul (KR)

(72) Inventors: Dong Eun Cha, Gyeonggi-do (KR); Hyun Gyung Kim, Gyeonggi-do (KR); Seung Mok Lee, Gyeonggi-do (KR); Phil Jung Jeong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 23 days.

(21) Appl. No.: 13/798,989

(22) Filed: Mar. 13, 2013

(65) Prior Publication Data

US 2014/0180546 A1    Jun. 26, 2014

(30) Foreign Application Priority Data

Dec. 21, 2012 (KR) .................. 10-2012-0150328

(51) Int. Cl.
*B60R 3/00* (2006.01)
*B60R 3/02* (2006.01)

(52) U.S. Cl.
CPC .... *B60R 3/02* (2013.01); *B60R 3/00* (2013.01)
USPC ................ 701/49; 701/36; 280/163; 280/166

(58) Field of Classification Search
CPC .......... B60R 3/00; B60R 3/002; B60R 3/007; B60R 3/02
USPC ........ 701/1, 28, 36, 39, 45, 49, 301; 180/274; 280/163, 164.1, 166
See application file for complete search history.

(56) References Cited

U.S. PATENT DOCUMENTS

| | | | |
|---|---|---|---|
| 6,178,364 B1 * | 1/2001 | Delurey et al. | 701/36 |
| 6,179,312 B1 * | 1/2001 | Paschke et al. | 280/166 |
| 6,264,222 B1 * | 7/2001 | Johnston et al. | 280/166 |
| 6,942,233 B2 * | 9/2005 | Leitner et al. | 280/166 |
| 8,002,298 B2 * | 8/2011 | Casbolt et al. | 280/166 |
| 8,662,512 B2 * | 3/2014 | May | 280/166 |
| 2005/0173886 A1 * | 8/2005 | Leitner | 280/166 |
| 2007/0200313 A1 * | 8/2007 | Tazreiter | 280/166 |
| 2009/0008895 A1 * | 1/2009 | Casbolt et al. | 280/166 |
| 2012/0139206 A1 * | 6/2012 | May | 280/166 |

FOREIGN PATENT DOCUMENTS

| | | |
|---|---|---|
| JP | 2007-326514 A | 12/2007 |
| KR | 10-1999-0050624 A | 7/1999 |
| KR | 10-2005-0031491 | 4/2005 |
| KR | 10-2005-0034872 A | 4/2005 |

* cited by examiner

*Primary Examiner* — Thomas Tarcza
*Assistant Examiner* — Tyler J Lee
(74) *Attorney, Agent, or Firm* — Edwards Wildman Palmer LLP; Peter F. Corless

(57) ABSTRACT

Disclosed herein is a technique for controlling a side step operation for a vehicle. The technique includes detecting, by a controller, whether an obstacle is present in a space where left and right side steps are configured to be released, before ejecting release operation thereof is performed. The technique additionally includes releasing, by the controller, the side step only when the obstacle is not present. When the side step is not released due to an obstacle, a warning mode for re-parking or mobility parking is displayed to a user.

16 Claims, 4 Drawing Sheets

FIG. 4
(TABLE1)
|    | S1   | S2   | S3   | S4   |
|----|------|------|------|------|
| S1 | -    | A1-1 | A2-1 | A3-1 |
| S2 | A1-2 | -    | B1-1 | B2-1 |
| S3 | A2-2 | B1-2 | -    | C1-1 |
| S4 | A3-2 | B2-2 | C1-2 | -    |
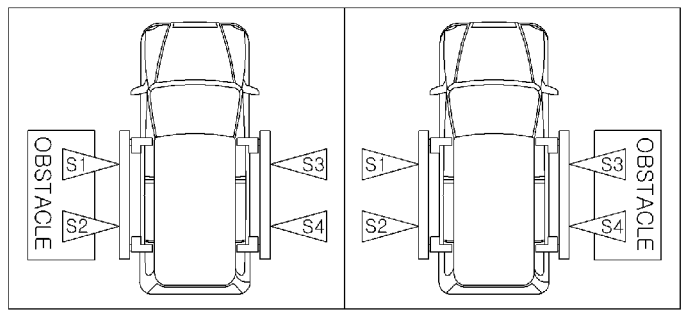
A1 Case     C1 Case
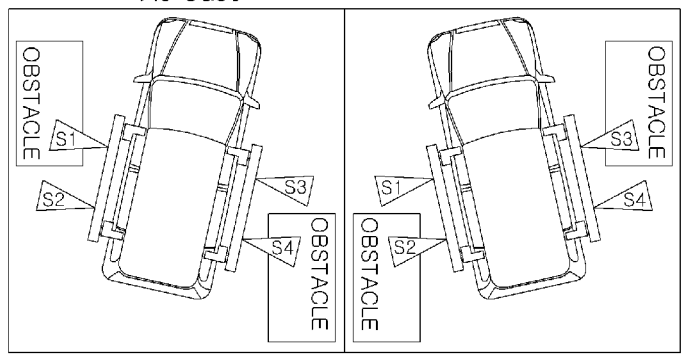
A3 Case     B1 Case
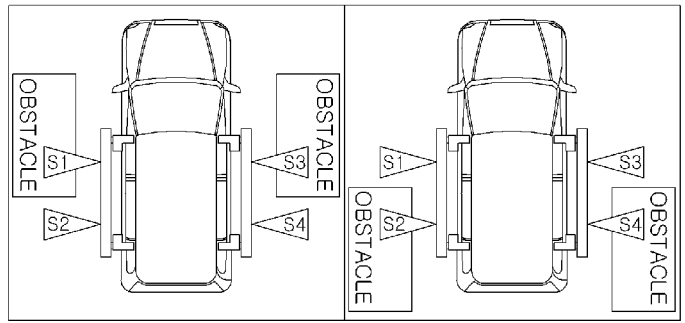
A2 Case     B2 Case (TABLE2)

|    | L1   | L2   | L3   | L4   |
|----|------|------|------|------|
| L1 | –    | D1-1 | D2-1 | D3-1 |
| L2 | D1-2 | –    | E1-1 | E2-1 |
| L3 | D2-2 | E1-2 | –    | F1-1 |
| L4 | D3-2 | E2-2 | F1-2 | –    |

D1 Case    F1 Case

D2 Case or E2 Case

D3 Case or E1 Case

METHOD FOR CONTROLLING OPERATION OF SIDE STEP FOR VEHICLE

CROSS REFERENCE

This application claims under 35 U.S.C. §119(a) the benefit of Korean Patent Application No. 10-2012-0150328 filed on Dec. 21, 2012, the entire contents of which are incorporated herein by reference.

BACKGROUND

1. Field of the Invention

The present invention relates to a method for controlling an operation of a side step for a vehicle and, more particularly, to a method for controlling an operation of a side step for a vehicle, which is capable of releasing the side step based on whether an obstacle is present in a direction in which the side step is released.

2. Description of the Related Art

A recreational vehicle (RV) having a chassis that is raised further from the ground than that of a general passenger vehicle may include a side step to allow a passenger to conveniently enter or exit a vehicle. As shown in FIG. 1, the side step 1 may be configured to be fixed to a vehicle body (side sill outer panel) 2. Alternatively, as shown in FIG. 2, a side step 3 may be automatically released from or retracted into a vehicle body 4, using a mechanical mechanism Furthermore, when the side step 3 is configured to be automatically released, the conventional side step 3 is operated to be released without considering whether an obstacle is present in the vicinity of the side step. A control is performed to release the side step 3 or retract the side step 3 only when the side step 3 directly collides with an obstacle.

Thus, in the conventional method for controlling the operation of the side step 3 a collision between the side step 3 and an obstacle may not be prevented in the release operation of the side step 3, thus causing damage to a drive device and the side step.

The foregoing is intended merely to aid in the understanding of the background of the present invention, and is not intended to mean that the present invention falls within the purview of the related art that is already known to those skilled in the art.

SUMMARY

Accordingly, the present invention provides a method for controlling a side step for a vehicle, in which a controller is configured to detect whether an obstacle is present in a space where the side step is released and thus the release of the side step may be controlled, and in which, when the controller determines that the side step may not be released due to an obstruction, a warning mode may be provided to a user.

The present invention further provides a method for controlling a side step of a vehicle, including determining whether an obstacle is present in a space where a left side step and a right side step may be released, before an release operation thereof is performed; and determining whether to perform the release operation of the left and right side steps, based on whether an obstacle is present.

In determining whether an obstacle is present, the controller may determine whether an obstacle is present on a side of each of the left and right side steps, in response to signals transmitted from a front side sensor and a rear side sensor mounted on the left side step and from a front side sensor and a rear side sensor mounted on the right side step. In addition, the controller may determine whether an obstacle is present on a bottom of each of the left and right side steps, in response to signals transmitted from a front bottom sensor and a rear bottom sensor mounted on the left side step and from a front bottom sensor and a rear bottom sensor mounted on the right side step.

When the controller determines, in response to the signals from the front side sensors and the rear side sensors, that an obstacle is not present on the side of each of the left and right side steps, the controller may release each of the left and right side steps. When the controller determines, in response to the signals from the front side sensors and the rear side sensors, that an obstacle is present on the side of each of the left and right side steps, the controller may prevent an operation of each of the left and right side steps thereby not releasing the side steps, and the controller may simultaneously display a warning mode to a user.

The warning mode may include a re-parking mode, and the re-parking mode may be provided when an obstacle detection signal is generated simultaneously from the front side sensor and the rear side sensor of the left side step, when the obstacle detection signal is generated simultaneously from the front side sensor and the rear side sensor of the right side step, when the obstacle detection signal is generated simultaneously from the front side sensor of the left side step and the rear side sensor of the right side step, and when the obstacle detection signal is generated simultaneously from the rear side sensor of the left side step and the front side sensor of the right side step.

Additionally, the warning mode may include a mobility parking mode, and the mobility parking mode may be provided when an obstacle detection signal is generated simultaneously from the front side sensor of the left side step and the front side sensor of the right side step, and when the obstacle detection signal is generated simultaneously from the rear side sensor of the left side step and the rear side sensor of the right side step.

When the controller determines, in response to the signals from the front bottom sensors and the rear bottom sensors, that an obstacle is not present under both the left side step and the right side step, the controller may release each of the left and right side steps. When the controller determines, in response to the signals from the front bottom sensors and the rear bottom sensors, that an obstacle is present only under either the left side step or the right side step, the controller may release side step under which no obstacle is detected. When the controller determines, in response to the signals from the front bottom sensors and the rear bottom sensors, that an obstacle is present under both the left side step and the right side step, the controller may prevent an operation of each of the left and right side steps, and may simultaneously display a warning mode to a user.

The warning mode may include a mobility parking mode, and the mobility parking mode may be provided when an obstacle detection signal is generated simultaneously from the front bottom sensor of the left side step and the front bottom sensor of the right side step, when the obstacle detection signal is generated simultaneously from the rear bottom sensor of the left side step and the rear bottom sensor of the right side step, when the obstacle detection signal is generated simultaneously from the front bottom sensor of the left side step and the rear bottom sensor of the right side step, and when the obstacle detection signal is generated simultaneously from the rear bottom sensor of the left side step and the front bottom sensor of the right side step.

As is apparent from the above description, the method for controlling the operation of the side step for the vehicle according to the present invention is advantageous in that, before the release operation is performed, determined controller may determine whether an obstacle is present in the space in which each of the left and right side steps may be released, thus the side steps may be released only when an obstacle is not present, to prevent any contact between the step and an obstacle, and to prevent the step drive device and the step from being damaged or broken due to a collision between the step and the obstacle. Another advantage of the present invention is that when the controller determines that a side step may not be released due to the presence of an obstacle, a user may be provided with a warning mode for re-parking or mobility parking via a display, thus improving the convenience of using the side step.

BRIEF DESCRIPTION OF THE DRAWINGS

The above and other objects, features and advantages of the present invention will be more clearly understood from the following detailed description taken in conjunction with the accompanying drawings, in which:

FIGS. 4 and 5 are exemplary views illustrating a method for controlling an operation of a side step for a vehicle according to an exemplary embodiment of the present invention, in which FIG. 4 is an exemplary view illustrating a control method using a side sensor and FIG. 5 is an exemplary view illustrating a control method using a bottom sensor.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, a method for controlling an operation of a side step for a vehicle according to exemplary embodiments of the present invention will be described with reference to the accompanying drawings.

Figure 1:
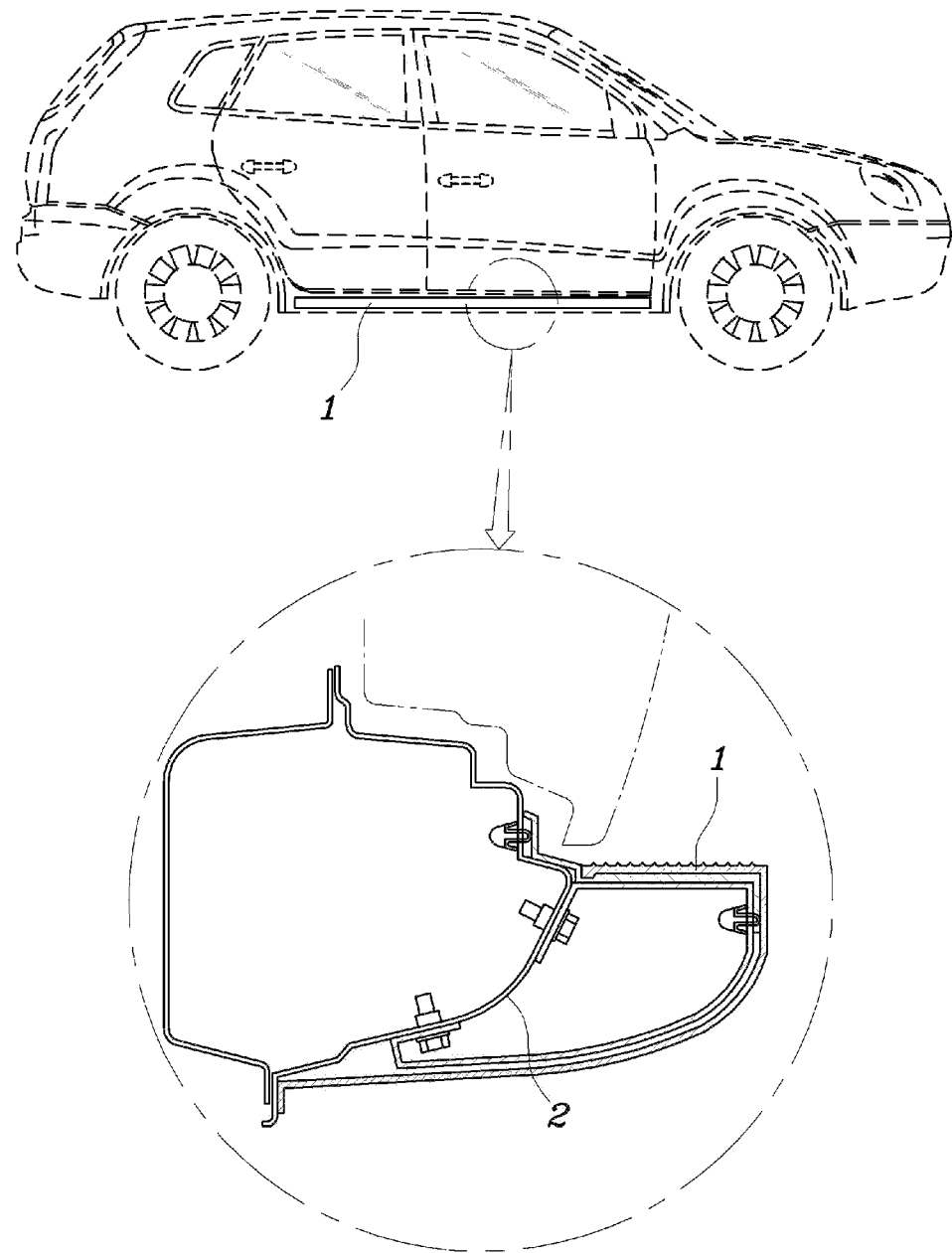
FIG. 1 is an exemplary view illustrating a fixed-type side step according to the related art.
Figure 2:
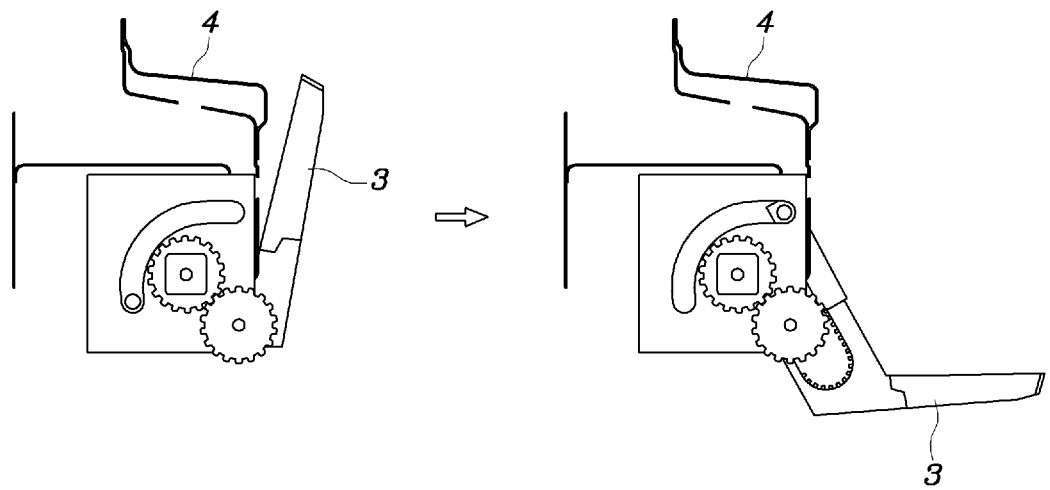
FIG. 2 is an exemplary view illustrating a side step capable of being released and retracted according to the related art.
Figure 3:
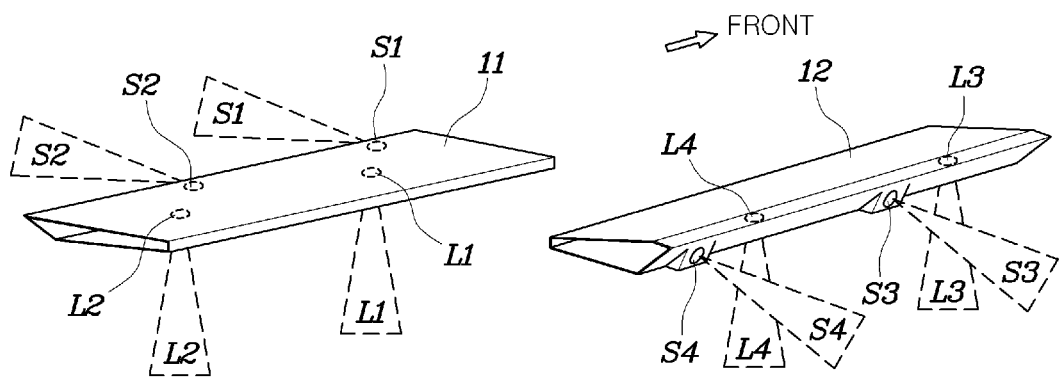
FIG. 3 is an exemplary view illustrating a left side step and a right side step controlled by a method according to an exemplary embodiment of the present.

The side step for the vehicle to which the technology of the present invention is applied may include a left side step 11 and a right side step 12, as shown in FIG. 3. The left side step 11 and the right side step 12 may be configured to be automatically released from or retracted into a vehicle body using a mechanical mechanism According to the present invention, a controller may detect whether an obstacle is present in a space where each of the left side step 11 and the right side step 12 may be released, prior to releasing the side steps. When an obstacle is present, the side steps may not be released and the controller may simultaneously output a warning mode to a user via a display.

Figure 5:
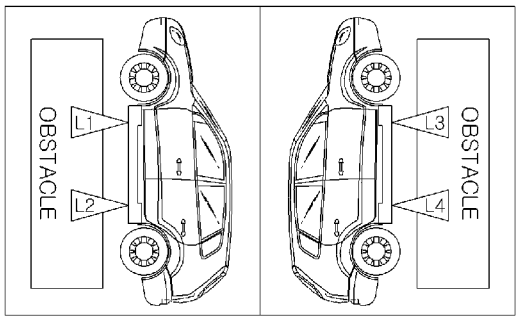

In other words, as shown in FIGS. 3 to 5, the method for controlling the operation of the side step for the vehicle according to the present invention may include an obstacle determination step of determining whether an obstacle is present in a space where each of a left side step 11 and a right side step 12 may be released, prior to releasing the side steps, and a release operation determination step of determining whether to perform the release operation of the side steps 11 and 12, based on a result determined at the obstacle determination step.

At the obstacle determination step, a controller may determine whether an obstacle is present on a side of each of the left and right side steps 11 and 12, in response to signals transmitted from a front side sensor S1 and a rear side sensor S2 mounted on the left side step 11 and from a front side sensor S3 and a rear side sensor S4 mounted on the right side step 12.

Based on the determined result, when the controller detects, in response to the signals from the front side sensors S1 and S3 and the rear side sensors S2 and S4, that an obstacle is not present on the side of each of the left and right side steps 11 and 12, the left and right side steps 11 and 12 may be released by the controller.

Further, based on the determined result, when the controller detects, in response to the signals from the front side sensors S1 and S3 and the rear side sensors S2 and S4, that an obstacle is present on the side of each of the left and right side steps 11 and 12, the left and right side steps 11 and 12 may not be released by the controller, and the controller may simultaneously output a warning mode to a user. Here, an exemplary embodiment wherein the warning mode is provided by signals from the front side sensors S1 and S3 and from the rear side sensors S2 and S4 will be described with reference to FIG. 4.

The warning mode may include a re-parking mode and a mobility parking mode. The re-parking mode may be output when (A1, C1) a parked vehicle turns to a left direction or a right direction and when (A3, B1) a parked vehicle turns to a diagonal direction. The mobility parking mode may be output when (A2, B2) obstacles are present on both of the left and right sides of the vehicle, wherein the left side step 11 nor the right side step 12 are released.

In other words, the re-parking mode may be output when (corresponding to A1-1 and A1-2 of Table 1 in A1) an obstacle detection signal is generated simultaneously from the front side sensor S1 and the rear side sensor S2 of the left side step 11, when (corresponding to C1-1 and C1-2 of Table 1 in C1) the obstacle detection signal is generated simultaneously from the front side sensor S3 and the rear side sensor S4 of the right side step 12, when (corresponding to A3-1 and A3-2 of Table 1 in A3) the obstacle detection signal is generated simultaneously from the front side sensor Si of the left side step 11 and the rear side sensor S4 of the right side step 12, and when (corresponding to B1-1 and B1-2 of Table 1 in B1) the obstacle detection signal is generated simultaneously from the rear side sensor S2 of the left side step 11 and the front side sensor S3 of the right side step 12. When one of the above situations occurs, information about the re-parking mode may be provided by the controller to a user via the display.

Further, the mobility parking mode may be output when (corresponding to A2-1 and A2-2 of Table 1 in A2) an obstacle detection signal is generated simultaneously from the front side sensor Si of the left side step 11 and the front side sensor S3 of the right side step 12, and when (corresponding to B2-1 and B2-2 of Table 1 in B2) the obstacle detection signal is generated simultaneously from the rear side sensor S2 of the left side step 11 and the rear side sensor S4 of the right side step 12. When one of the above situations occurs, information about the mobility parking mode may be provided by the controller to a user via the display.

Further, at the obstacle determination step, the controller may determine whether an obstacle is present under the left and right side steps 11 and 12, in response to signals transmitted from a front bottom sensor L1 and a rear bottom sensor L2 mounted on the left side step 11 and from a front bottom sensor L3 and a rear bottom sensor L4 mounted on the right side step 12.

Based on the determined result, when the controller determines, in response to the signals from the front bottom sensors L1 and L3 and the rear bottom sensors L2 and L4, that an obstacle is not present under both the left side step 11 and the right side step 12, the left and right side steps 11 and 12 may both be released.

Further, when the controller detects, in response to the signals from the front bottom sensors L1 and L3 and the rear bottom sensors L2 and L4, that an obstacle is present only under either the left side step 11 or the right side step 12, the side step under which no obstacle is detected may be released.

In other words, when an obstacle is present only under either the left side step 11 or the right side step 12, such as when a vehicle is parked on a sloping street, either the left side or the right side of the parked vehicle may be tilted in an upward direction. The left or right step of the vehicle which is located at a relatively low position may not perform the release operation due to the obstacle under the associated step. In contrast, the left or right step which is located at a relatively high position may perform the release operation because no obstacle is present under the associated step.

Further, based on the determined result, when the controller detects, in response to the signals from the front bottom sensors L1 and L3 and the rear bottom sensors L2 and L4, that an obstacle is present under both the left side step 11 and the right side step 12, the controller may prevent the left and right side steps 11 and 12 from being released, and may simultaneously display a warning mode to a user. Here, an embodiment wherein the warning mode is provided by signals from the front bottom sensors L1 and L3 and from the rear side sensors L2 and L4 will be described with reference to FIG. 5.

The warning mode may include the mobility parking mode. The mobility parking mode may include situations (D2, E2, D3, and E1) when obstacles are present under both the left side step 11 and the right side step 12, wherein the controller prevents both the side steps from being released.

In other words, the mobility parking mode may be output when (corresponding to D2-1 and D2-2 of Table 2 in D2) an obstacle detection signal is generated simultaneously from the front bottom sensor L1 of the left side step 11 and the front bottom sensor L3 of the right side step 12, when (corresponding to E2-1 and E2-2 of Table 2 in E2) the obstacle detection signal is generated simultaneously from the rear bottom sensor L2 of the left side step 11 and the rear bottom sensor L4 of the right side step 12, when (corresponding to D3-1 and D3-2 of Table 2 in D3) the obstacle detection signal is generated simultaneously from the front bottom sensor L1 of the left side step 11 and the rear bottom sensor L4 of the right side step 12, and when (corresponding to E1-1 and E1-2 of Table 2 in E1) the obstacle detection signal is generated simultaneously from the rear bottom sensor L2 of the left side step 11 and the front bottom sensor L3 of the right side step 12. When one of the above situations occurs, information about the mobility parking mode may be provided by the controller to a user.

As described above, the present invention provides a method for controlling an operation of a side step for a vehicle, in which, before a release operation is performed, a controller may determine whether an obstacle is present in the space in which each of left and right side steps 11 and 12 may be released, thus the side step may only be released when an obstacle is not present, thus preventing any contact between the step and an obstacle, and thereby preventing a step drive device and the step from being damaged or broken due to a collision between the step and the obstacle.

Further, the present invention provides a method for controlling an operation of a side step for a vehicle, in which, when a controller determines that the side step may not be released, the controller may output to a user can a warning mode for re-parking or mobility parking via a display, thus further improving the convenience of using the side step.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a side step of a vehicle, comprising:
   detecting, by a controller, whether an obstacle is present in a space where a left side step and a right side step are configured to be released, before releasing the side step, wherein detecting, by the controller, whether the obstacle is present further includes:
   detecting, by the controller, whether an obstacle is present on a side of the left and right side steps, in response to signals transmitted from a front side sensor and a rear side sensor mounted on the left side step and from a front side sensor and a rear side sensor mounted on the right side step; and
   determining, by the controller, whether to release the left and right side steps, based on whether an obstacle is detected.

2. A method for controlling a side step of a vehicle, comprising:
   detecting, by a controller, whether an obstacle is present in a space where a left side step and a right side step are configured to be released, before releasing the side step, wherein detecting, by the controller, whether the obstacle is present further includes:

detecting, by the controller, whether the obstacle is present on a bottom of the left and right side steps, in response to signals transmitted from a front bottom sensor and a rear bottom sensor mounted on the left side step and from a front bottom sensor and a rear bottom sensor mounted on the right side step; and determining, by the controller, whether to release the left and right side steps, based on whether an obstacle is detected.

3. The method of claim 1, further comprising:
releasing, by the controller, the left and right side steps, in response to detecting that no obstacle is present on the side of the left and right side steps based on the signals from the front side sensors and the rear side sensors.

4. The method of claim 1, further comprising:
preventing, by the controller, the release of the left and right side steps, in response to detecting that the obstacle is present on the side of the left and right side steps based on the signals from the front side sensors and the rear side sensors; and
displaying, by the controller, a warning mode to a user.

5. The method of claim 4, wherein the warning mode comprises a re-parking mode, and the re-parking mode is output when an obstacle detection signal is generated simultaneously from the front side sensor and the rear side sensor of the left side step, when the obstacle detection signal is generated simultaneously from the front side sensor and the rear side sensor of the right side step, when the obstacle detection signal is generated simultaneously from the front side sensor of the left side step and the rear side sensor of the right side step, or when the obstacle detection signal is generated simultaneously from the rear side sensor of the left side step and the front side sensor of the right side step.

6. The method of claim 4, wherein the warning mode comprises a mobility parking mode, and the mobility parking mode is output when an obstacle detection signal is generated simultaneously from the front side sensor of the left side step and the front side sensor of the right side step, or when the obstacle detection signal is generated simultaneously from the rear side sensor of the left side step and the rear side sensor of the right side step.

7. The method of claim 2, further comprising:
releasing, by the controller, the left and right side steps, in response to detecting the obstacle is not present under both the left side step and the right side step based on the signals from the front bottom sensors and the rear bottom sensors.

8. The method as set forth in claim 2, further comprising:
releasing, by the controller, either the left side step or the right side step based on whether the obstacle is detected under the left side step or the right side step, in response to the signals from the front bottom sensors and the rear bottom sensors.

9. The method as set forth in claim 2, further comprising:
preventing, by the controller, the release of the left and right side steps in response to detecting the obstacle under both the left side step and the right side step based on the signals from the front bottom sensors and the rear bottom sensors; and
displaying, by the controller, a warning mode to a user.

10. The method as set forth in claim 9, wherein the warning mode comprises a mobility parking mode, and the mobility parking mode is output when an obstacle detection signal is generated simultaneously from the front bottom sensor of the left side step and the front bottom sensor of the right side step, when the obstacle detection signal is generated simultaneously from the rear bottom sensor of the left side step and the rear bottom sensor of the right side step, when the obstacle detection signal is generated simultaneously from the front bottom sensor of the left side step and the rear bottom sensor of the right side step, or when the obstacle detection signal is generated simultaneously from the rear bottom sensor of the left side step and the front bottom sensor of the right side step.

11. A system for controlling a side step of a vehicle, comprising:
a controller configured to:
detect whether an obstacle is present in a space where a left side step and a right side step are configured to be released, before releasing the side step, wherein detection whether the obstacle is present includes:
detection whether an obstacle is present on a side of the left and right side steps, in response to signals transmitted from a front side sensor and a rear side sensor mounted on the left side step and from a front side sensor and a rear side sensor mounted on the right side step; and
determine whether to release the left and right side steps, based on whether an obstacle is detected.

12. A system for controlling a side step of a vehicle, comprising:
a controller configured to:
detect whether an obstacle is present in a space where a left side step and a right side step are configured to be released, before releasing the side step, wherein detection whether the obstacle is present includes:
detect whether an obstacle is present on a bottom of the left and right side steps, in response to signals transmitted from a front bottom sensor and a rear bottom sensor mounted on the left side step and from a front bottom sensor and a rear bottom sensor mounted on the right side step; and
determine whether to release the left and right side steps, based on whether an obstacle is detected.

13. The system of claim 11, where the controller is further configured to:
release the left and right side steps, in response to detecting that no obstacle is present on the side of the left and right side steps based on the signals from the front side sensors and the rear side sensors.

14. The system of claim 11, wherein the controller is further configured to:
prevent the release of the left and right side steps, in response to detecting that the obstacle is present on the side of the left and right side steps based on the signals from the front side sensors and the rear side sensors; and
display a warning mode to a user.

15. A non-transitory computer readable medium containing program instructions executed by a processor or controller, the computer readable medium comprising:
program instructions that detect whether an obstacle is present in a space where a left side step and a right side step are configured to be released, before releasing the side step, wherein the program instructions that detect whether the obstacle is present further include:
program instructions that release the left and right side steps, in response to detecting that no obstacle is present on the side of the left and right side steps based on signals transmitted from a front side sensor and a rear side sensor mounted on the left side step and from a front side sensor and a rear side sensor mounted on the right side step; and
program instructions that determine whether to release the left and right side steps, based on whether an obstacle was detecting.

16. The non-transitory computer readable medium of claim 15, further comprising:
   program instructions that prevent the release of the left and right side steps, in response to detecting that the obstacle is present on the side of the left and right side steps based on signals transmitted from a front bottom sensor and a rear bottom sensor mounted on the left side step and from a front bottom sensor and a rear bottom sensor mounted on the right side step; and
   program instructions that display a warning mode to a user.

* * * * *